J. V. N. DORR.
APPARATUS FOR THE SEPARATION OF FINELY DIVIDED SOLIDS FROM LIQUIDS.
APPLICATION FILED JUNE 5, 1913.

1,135,997.

Patented Apr. 20, 1915.
6 SHEETS—SHEET 1.

WITNESSES:
C. B. Schroeder
E. L. Ellis

INVENTOR
John V. N. Dorr
BY
Pennie, Davis, Goldsborough
ATTORNEYS

J. V. N. DORR.
APPARATUS FOR THE SEPARATION OF FINELY DIVIDED SOLIDS FROM LIQUIDS.
APPLICATION FILED JUNE 5, 1913.

1,135,997.

Patented Apr. 20, 1915.
6 SHEETS—SHEET 2.

WITNESSES:

INVENTOR
John V. N. Dorr
BY
ATTORNEYS

J. V. N. DORR.
APPARATUS FOR THE SEPARATION OF FINELY DIVIDED SOLIDS FROM LIQUIDS.
APPLICATION FILED JUNE 5, 1913.

1,135,997.

Patented Apr. 20, 1915.

J. V. N. DORR.
APPARATUS FOR THE SEPARATION OF FINELY DIVIDED SOLIDS FROM LIQUIDS.
APPLICATION FILED JUNE 5, 1913.

1,135,997.

Patented Apr. 20, 1915.
6 SHEETS—SHEET 4.

J. V. N. DORR.
APPARATUS FOR THE SEPARATION OF FINELY DIVIDED SOLIDS FROM LIQUIDS.
APPLICATION FILED JUNE 5, 1913.

1,135,997.

Patented Apr. 20, 1915.
6 SHEETS—SHEET 5.

Fig. 10.

UNITED STATES PATENT OFFICE.

JOHN V. N. DORR, OF DENVER, COLORADO.

APPARATUS FOR THE SEPARATION OF FINELY-DIVIDED SOLIDS FROM LIQUIDS.

1,135,997.  Specification of Letters Patent.  Patented Apr. 20, 1915.

Application filed June 5, 1913. Serial No. 771,917.

*To all whom it may concern:*

Be it known that I, JOHN V. N. DORR, a citizen of the United States, residing at Denver, county of Denver, State of Colorado, have invented certain new and useful Improvements in Apparatus for the Separation of Finely-Divided Solids from Liquids; and I do hereby declare the following to be a full, clear, and exact description of the invention, such as will enable others skilled in the art to which it appertains to make and use the same.

This invention relates to apparatus for effecting the rapid separation, by a process of settling, of finely divided solid particles from large volumes of liquid in which they are suspended, so as to produce on the one hand a continuous overflow of clear liquid and on the other hand an underflow or subsurface withdrawal of the solid particles mixed with a relatively small proportion of the liquid, in the form of a thickened slime or pulp.

The invention is particularly applicable to the handling of the large volumes of water used in the water-concentration of ores containing valuable minerals. This water carries in suspension quantities of finely divided solids, small in proportion to the quantity of water but great in the aggregate, and containing substantial metallurgical values in the recovery of which economy of handling is of prime importance. In many plants, moreover, the cost of the water is such that its clarification for re-use is essential to profitable operation. It is the custom now to recover the water and thicken the slimes or pulp in a multiplicity of small settling tanks, either 60° cones or cylindrical coned-bottom tanks, which are expensive to install and require great attention and careful regulation. The thickener disclosed in my U. S. Patent No. 867,958 of Oct. 15, 1907, permits the use of large units to replace the cones, and is in use in many plants for the same purpose; but these units occupy a large floor space, and the duplication of units involves the duplication of operating mechanism and accessories, while certain practical limits are imposed upon the size of the tanks that can be profitably used because of structural considerations and because the slowly revolving sweeps which are necessary in such thickeners attain in their extended extremities a speed such as to stir up the liquid and prevent settling, if the speed at the center is sufficient to avoid solid packing of the thickened material. Furthermore the strains incident to the movement, by the sweeps, of solid material deposited near the periphery become excessive.

I have found that in place of the thickening tanks 8 to 20 feet deep usually used for this purpose, it is possible, without reducing the settling capacity, to substitute tanks so shallow that the space below the surface current or flow disturbance is practically eliminated. In such a tank say three feet or less in depth, the solid matter is deposited with undiminished efficiency from the flowing current in its passage through the separating region, and by superposing a series of tanks one above the other and providing them with common operating mechanism, I produce a single separating unit, which is in effect made up of a series of superposed separating regions and associated elements for collecting and removing the thickened material. Such a unit has a total settling area considerably larger than would otherwise be feasible, and requires only a fraction of the floor space, building, operating mechanism and accessories otherwise needed.

In the accompanying drawings I have shown several embodiments of my invention.

Figure 1:
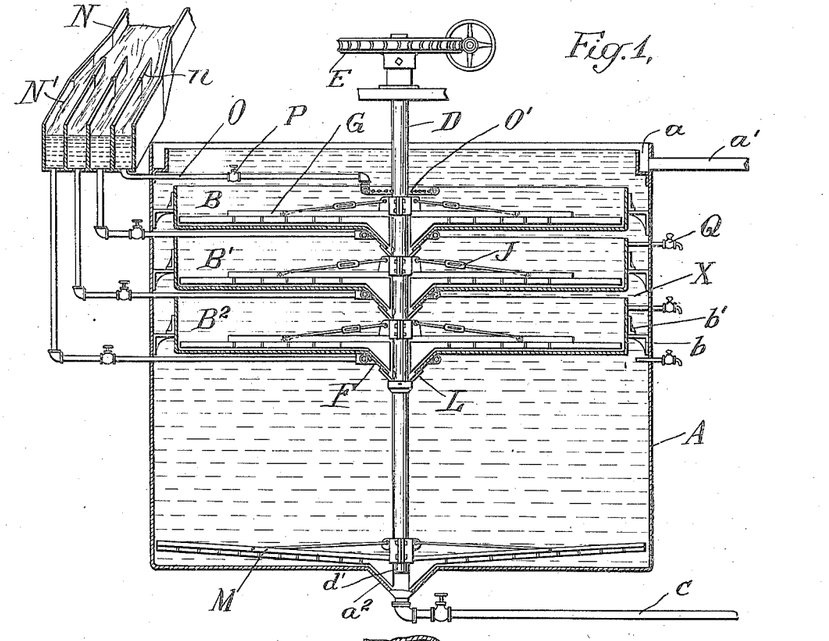
Figure 1 shows a vertical central section through a separating apparatus embodying the invention in a developed form involving the use of a plurality of superposed cylindrical trays in a single inclosing tank.
Figure 2:
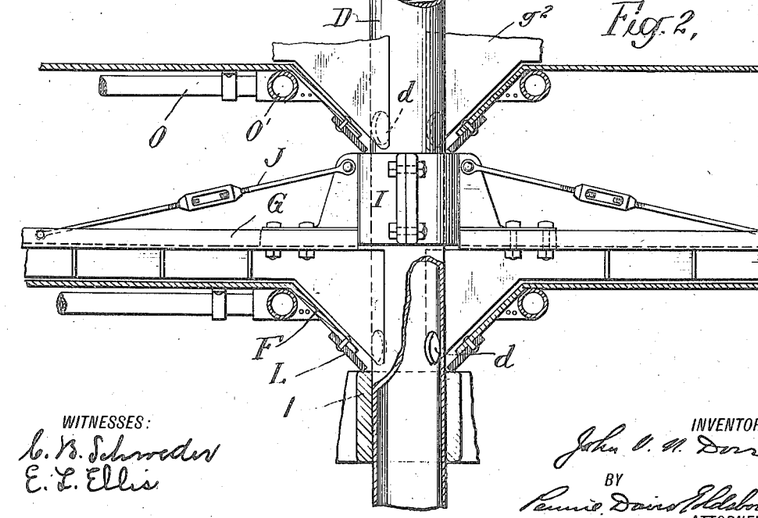
Fig. 2 is a detail view on an enlarged scale showing particularly how the common discharge pipe for the trays is related to said trays, and how the sweeps are attached to and supported on said pipe.

The apparatus shown in Figs. 1 and 2 comprises a cylindrical tank A within which a plurality of trays B, B', B² are arranged. The tank A may be of large dimensions, say 12 feet high by 20 feet in diameter, but these dimensions may be varied within wide limits. The tank is, of course, suitably supported on appropriate framework which, it is thought, is unnecessary to show in the drawings, and any desired number of trays within the limits of the dimensions of the tank may be used. The tank A has at the top an overflow launder $a$ communicating with a discharge pipe $a'$ and at the bottom the tank is preferably, though not necessarily, formed with a depression or hopper $a^2$ at the center of the tank which communicates with a valved discharge pipe C. Centrally suspended within the tank A is a hollow shaft D which terminates at $d'$ near the bottom of the tank. This hollow shaft may be supported or suspended in any suitable way and it is revolved slowly by any suitable driving mechanism E. The trays B, B', etc., are supported within the tank A in any suitable way. As shown the tank A carries brackets $b$ and the trays are provided with flanges or brackets $b'$ which rest on the brackets $b$. The trays are of somewhat less diameter than the tank and are arranged within the tank in such manner as to provide spaces X between their sides and the sides of the tank. The tank A is, of course, made strong enough in any suitable way to sustain the pressure of the weight of liquid which it contains. The trays may be made relatively light as the weight which they carry is comparatively small. The hollow shaft D extends centrally through the trays and each tray is preferably, though not necessarily, formed at the center with a depression or hopper F through which the hollow shaft extends.

Figure 5:
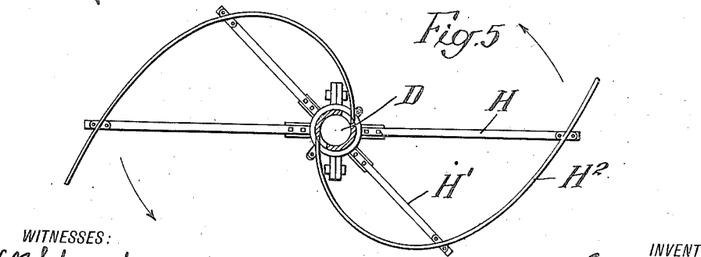

In the apparatus shown, and as preferred, the shaft D carries slowly rotated sweeps G for promoting or assisting in the discharge of the thickened material. Those sweeps comprise radially extended arms $g$, or H H' in Fig. 5, preferably carrying vanes or blades $g'$, $g^2$, $g^3$ or H². The effect of these sweeps, which are slowly rotated, is to promote or assist in the discharge of the thickened materials from the center of the trays through outlet pipes. It is only by the use of sweeps that it becomes possible to handle the slimes in substantially flat bottomed tanks. With coned-bottom tanks of sufficient inclination, 60° or more, they are not necessary.

Referring again to Figs. 1 and 2, it will be observed that the sweeps G are supported from the hollow shaft D by split hubs I of well-known construction, and adjustable braces J of well known form are also employed for the purpose of holding the conveyers in proper position. The shaft D is provided with openings $d$ to receive the thickened material from each tray. These openings are preferably located adjacent the depressions or hoppers F and the vanes $g^2$ at the inner ends of the conveyer arms $g$ are preferably enlarged and extend downward into said depressions or hoppers for the purpose of assisting in the discharge through the openings $d$ of the thickened material. The trays are separated from each other in the manner shown and in order to shut off communication between a tray and the one immediately above it, I provide on the bottom of each hopper F a strip of rubber or other suitable material L which rests on the top of the collar I. This will prevent the flow of slimes or pulp out of one hopper into a tray immediately below it or the flow of liquid upwardly from one tray into an adjacent hopper above it. The shaft D also carries sweeps M similar to those before mentioned and operating in the lower portion of the tank A.

In order to feed to the apparatus the pulp or other material to be clarified I preferably employ the devices shown, although other means may be used for this purpose. As shown, however, the liquid to be treated is conveyed through a trough N to a box N' where it is sub-divided. Gates $n$ or their equivalent may be used to control the flow of liquid from the trough N to the compartments in the box N'. Each compartment in the box N' is connected by a pipe O with a perforated distributing ring or annular header O', and each of the pipes O may, if desired, be provided with a valve P for regulating the flow. The valves shown are of conventional form, but other kinds of valves may be used and these valves may be differently located. In order to avoid the entrapping of air in the liquid feed it is desirable to arrange the compartments of the flow-box N' at approximately the level of the tank overflow so that there will always be some depth of liquid in said compartments. The liquid to be treated is supplied simultaneously through the pipes O and annular headers O' to the several trays. The solids drop to the bottom of the trays while the clear liquid rises and passes over the edge of each tray and then continues upwardly to the overflow launder a of the tank A. The thickened material in each tray flows to the discharge orifices d of the hollow shaft D through which shaft it descends. By reason of this construction, the thickened materials from the three superposed separating trays B, B' and B² is discharged into the lower portion of the subjacent tank volume. The point of discharge is here shown at d' quite near the bottom of the tank, but it may be higher up if desired. The lower portion of the tank thus serves as a receptacle for the thickened materials coming from the overflow trays, and at the same time its upper portion serves as a fourth separating element having its own flow-region for the dilute slimes supplied from the inlet header O' immediately beneath the bottom tray. This lower portion of the tank of large volume gives to the tank a certain advantageous storage capacity and adds flexibility with respect to the degree of thickening which may be attained with a given material, the preliminary thickening taking place in the superposed trays, and in the upper portion of the subjacent tank volume, while the further and final thickening takes place in the lower part of the tank, and the finally thickened materials are discharged with the aid of the sweep M, through an outlet pipe C. It will be observed that the material collected in each tray does not pass to another tray but immediately passes to a common discharge pipe and that the material collected on the bottom of the tank A does not pass to another tray or tank but flows to a common discharge. By these improvements it will be observed that a very large and extended settling area is afforded within a small cubic space so that space is materially economized and the cost of framework, housing, roofs, and machinery is greatly reduced.

Figure 3:
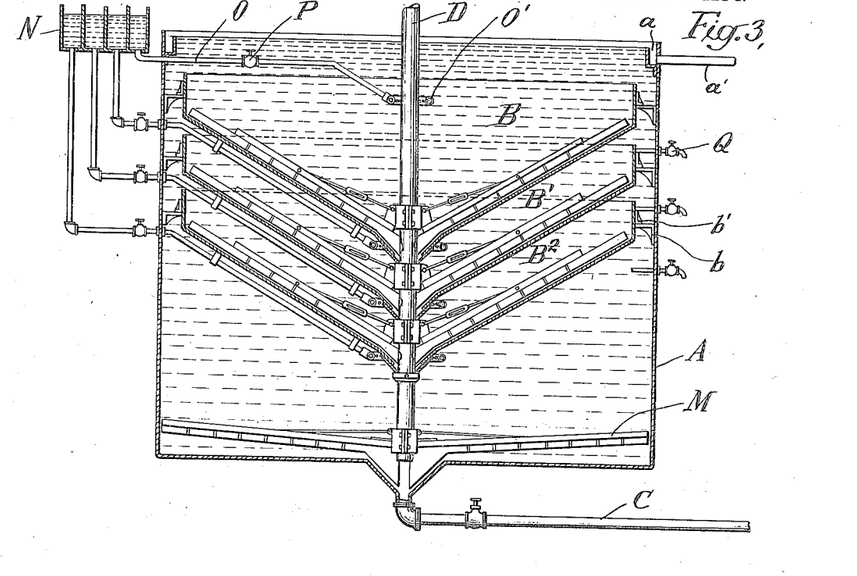
Fig. 3 is a view similar to Fig. 1 of an apparatus in which the trays are formed with inclined or coned bottoms.
Figure 4:
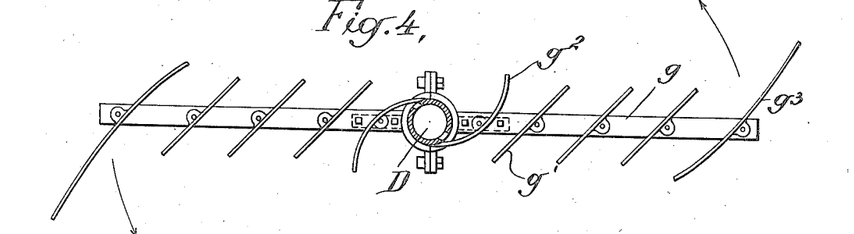
Figs. 4 and 5 are detail views on an enlarged scale showing different forms of sweeps.

In Fig. 3 the construction of the apparatus is similar in most respects to that shown in Fig. 1. In this case, however, the trays are shown as being formed with inclined bottoms.

The use of coned bottom tanks becomes feasible where the tanks can be nested within the outer tank of the unit as illustrated in this figure, because by this arrangement the increase in vertical height incident to superposing coned bottom tanks is avoided. Furthermore, in this arrangement the effective length of the three lower separation current paths is increased, the current of clear liquid flowing in each case from the central inlet header O' along the under surface of the overlying cone to the peripheral discharge, while the thickened material flows oppositely to the sub-surface discharge outlets therefor. The parts of the apparatus shown in Fig. 3 corresponding with parts in Fig. 1 are similarly lettered.

Figure 6:
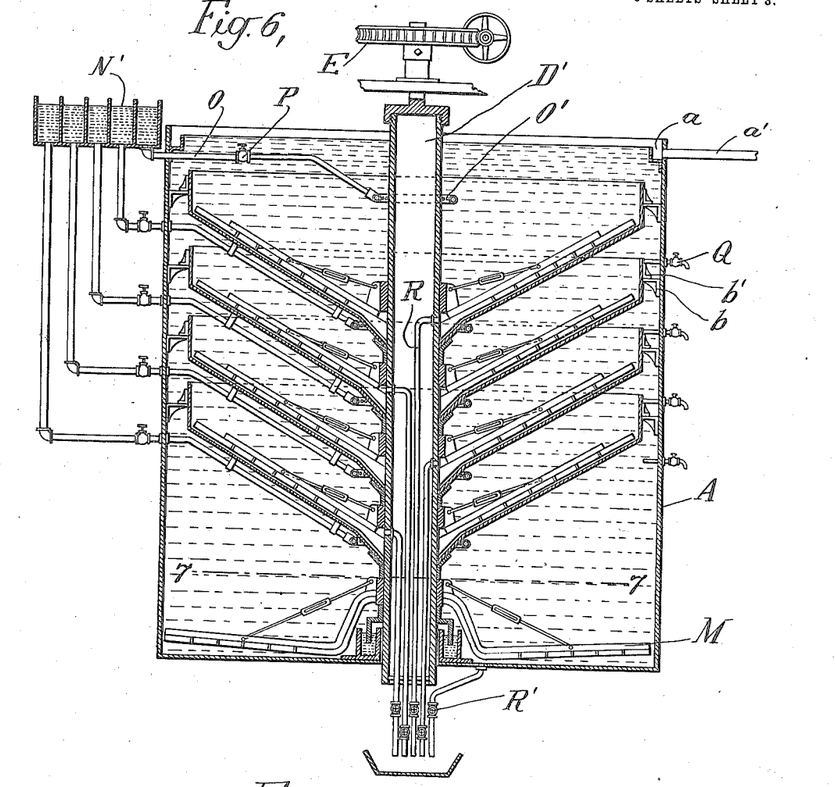
Fig. 6 is a central vertical section through a further modification of the separating apparatus in which the discharge from the several trays is led off separately and may be separately controlled.
Figure 7:
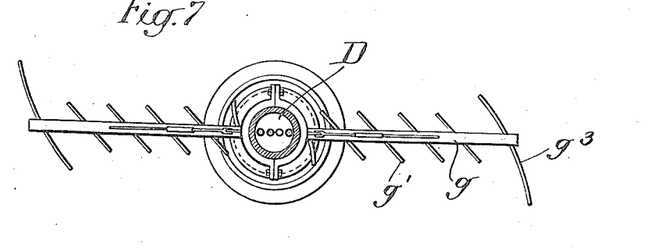
Fig. 7 is a section on the line 7—7 of Fig. 6.

Figs. 6 and 7 represent a similar arrangement of superposed coned bottom tanks, but instead of providing for the discharge of the thickened materials from the individual trays into the lower portion of the tank through the central pipe D, the discharge from the individual trays is kept separate, and is led off through the pipes R controlled by the valves R', and the central tube D' passes through the closure comprising an annular mercury seal as shown. This arrangement makes possible the individual control of the materials discharged from each tray. I may also economize space and secure efficiency in operation by the arrangement of apparatus shown in Fig. 8 where the tanks or trays are separately supported on a suitable framework and the inclosing tank shown in Fig. 1 is omitted. As illustrated the tanks S are supported one above the other in a suitable framework T, the details of which need not be described as such details may be varied and the construction is sufficiently illustrated in the drawings. Each tray is of large diameter and comparatively shallow and each one is provided with an overflow launder s for the clear liquid and with a discharge pipe U which communicates with an orifice in the bottom of the tank near the central portion thereof. Each tank is separately supplied with liquid to be treated through pipes V provided with valves v and communicating with a divided feed box V'. A shaft W extends centrally through all the tanks and this shaft may be driven by suitable driving mechanism W'. The shaft terminates a short distance above the bottom of the lowermost tank and it is suitably supported or hung in bearings w of any suitable construction. Each tank is provided at the center with a cylindrical casing S' through which the shaft W extends. This casing extends to the top of the tank above the liquid level so that the liquid shall not come in contact with the shaft and shall be confined in the space between the outer walls of the tank and the casing. Mercury seals such as shown in Fig. 6 may be substituted for these casings.

Figure 8:
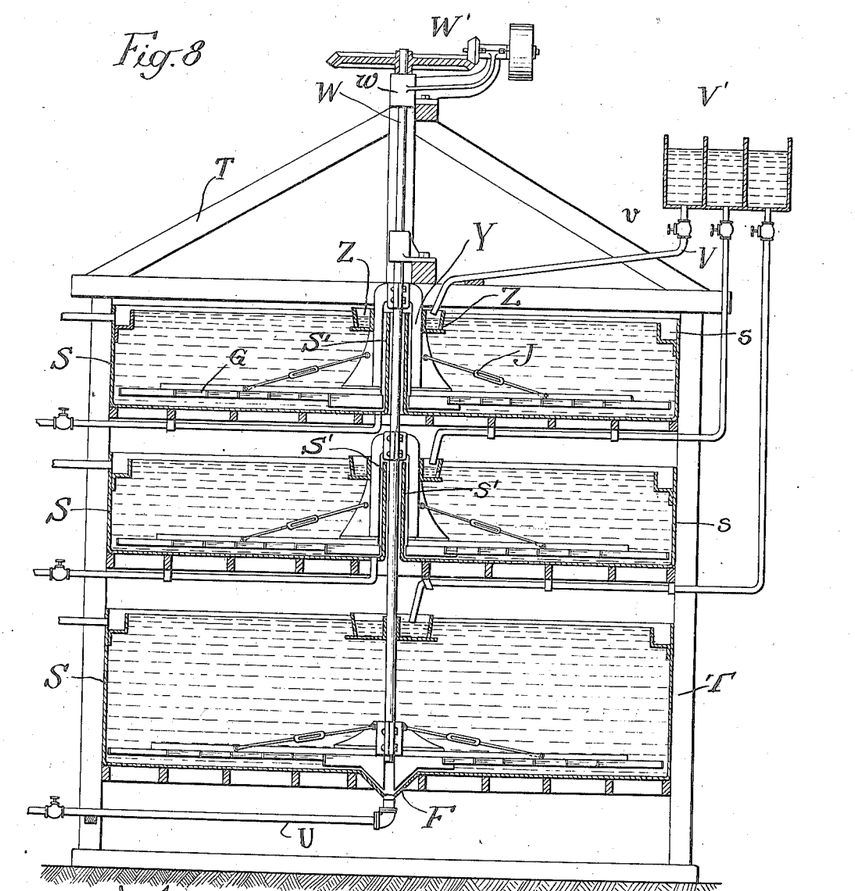
Fig. 8 shows a vertical central section of a modified form of the apparatus, in which a plurality of cylindrical settling vessels or tanks are arranged one above the other and supported on a suitable f.  .me, there being in this instance no tank for inclosing the trays or settling vessels.
Figure 9:
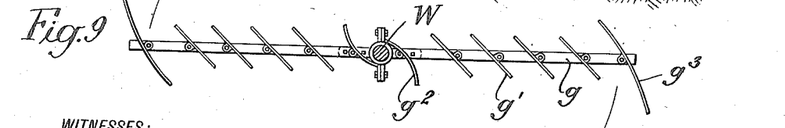
Fig. 9 is a detail view of a modified form of sweep.

In order to promote or assist in the discharge of the thickened material sweeps G similar in all respects to those hereinbefore described may be employed. The sweeps are connected with shaft W by yokes or frames Y which are made sectional or in two parts as shown and bolted to the shaft and to each of these frames Y is attached a feed launder or overflow header Z perforated at $z$ for the delivery of the liquid. The launder Z supplying the lowermost tank may be supported in any suitable way.

Figure 10:
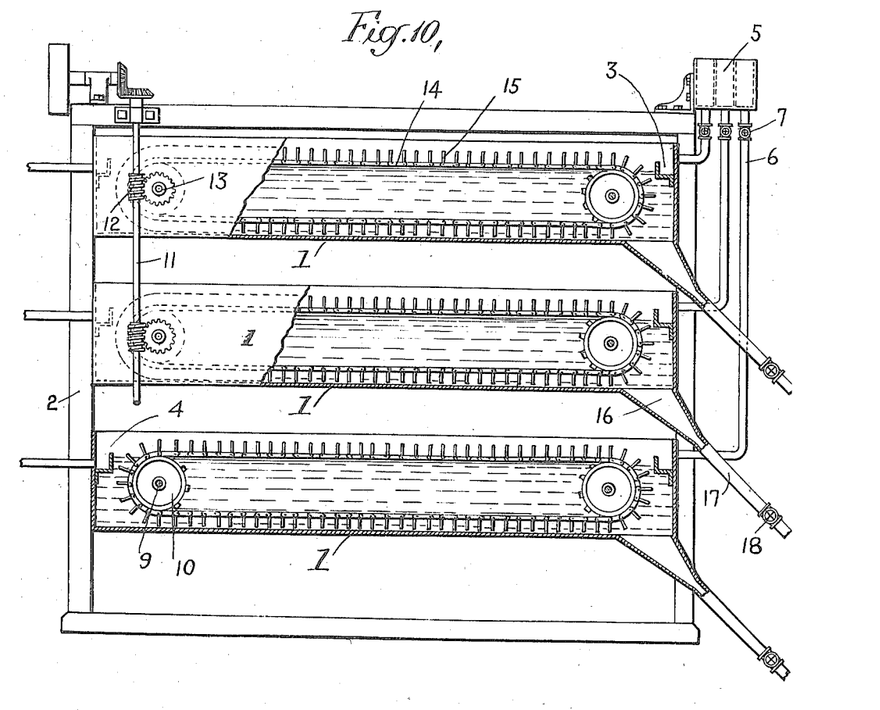
Fig. 10 is a sectional view of a separating apparatus composed of a plurality of superposed rectangular trays with traveling sweeps spaced apart on endless chains.

In the apparatus shown in Fig. 10 the several rectangular tanks 1 are supported in a framework 2, and each tank has a transverse supply launder or overflow header 3 at one end and a transverse overflow launder 4 at the opposite end, the supply headers being fed from the divided flow-box 5 through pipes 6 which may have control valves 7. Supported in suitable manner at each end of each tank is a shaft 9 carrying a pair of sprocket wheels 10, one or both of the shafts being slowly driven from a common vertical drive shaft or shafts 11 through worms 12 and worm wheels 13. A pair of chains 14 run over the sprocket wheels 10 and carry spaced sweeps 15 as shown. The thickened material is discharged through the individual discharge spouts 16 converging to the pipes 17 controlled by valves 18.

Figures 11, 12, 13:
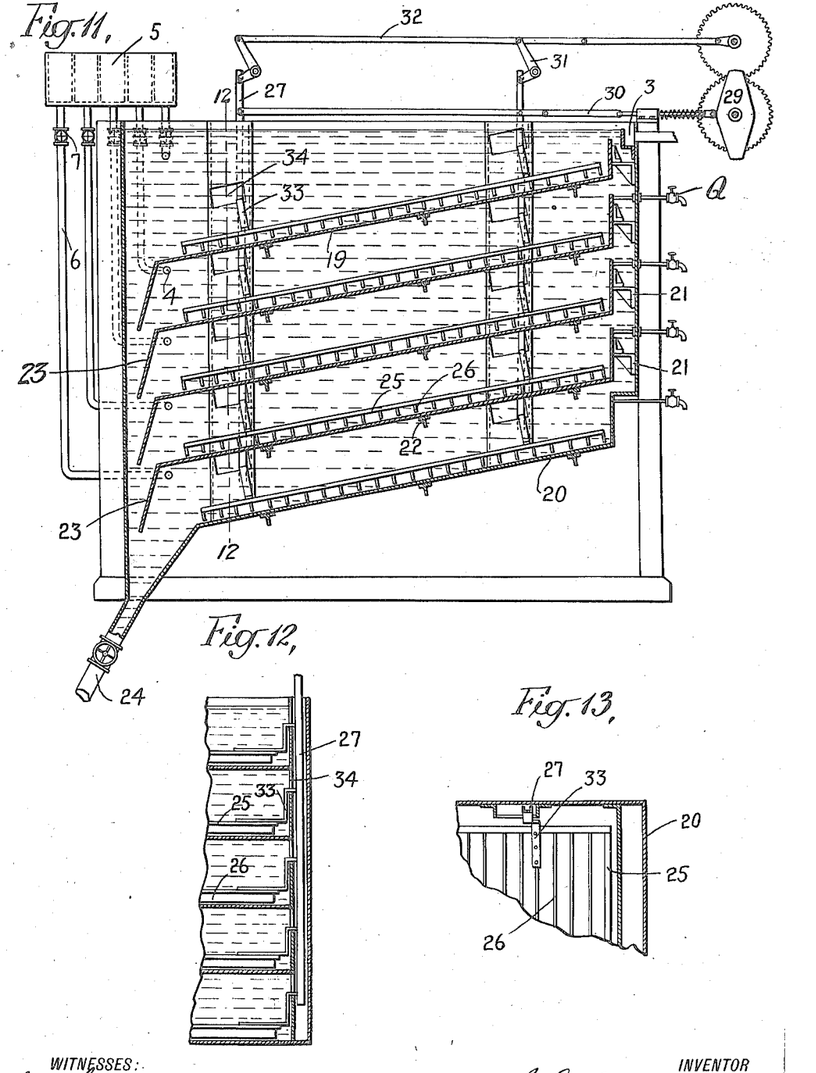
Fig. 11 illustrates an arrangement within an inclosing tank of superposed inclined trays with reciprocating sweeps.
Fig. 12 is a section on line 12—12 of Fig. 11.
Fig. 13 is a fragmentary detail plan showing the manner of connecting the reciprocating sweeps to the vertical supporting bars or channel irons.

In the arrangement of Figs. 11, 12 and 13 the superposed trays 19 are supported in inclined position in the tank 20 by brackets 21 and transverse T-beams 22. This arrangement has in common with the coned-bottom arrangement of Figs. 3 and 6, the advantage of long separating flow region and opposed current flow of the clear liquid and the thickened material respectively. The several trays have at their ends depending aprons 23 which effectively serve to prevent the admixture of the outgoing thickened material from one tank with the incoming liquid in the subjacent tank. As shown the several trays discharge their thickened material into the vertical space between the aprons 23 and the wall of the tank, and the final discharge of thickened material from the unit is through the common outlet pipe 24; but by extending the aprons to the adjacent tank wall and providing separate discharge pipes for each tray individual discharge may easily be provided for. Each tray has a reciprocating frame 25 carrying a series of sweeps 26, the frames being connected by the bracket arms 33, extending through slots 34 at about half the depth of the tray, to the vertical supporting bars 27 operated by the driven cam 29 through the levers 30, 31 and 32.

In the operation of the apparatus in any of its various forms the liquid to be treated is fed to the several headers through the supply pipes and the overflowing streams from the several trays are led off, separately or united as the case may be. The result is a plurality of superposed separating flow regions simultaneously operating within the single unit. The discharge of the thickened materials takes place from the bottoms of the several trays, assisted by the slowly moving sweeps if necessary. By this expedient a large settling area is obtained on a relatively small floor space and the parts are compactly arranged. Roofing or housing may be used which is much smaller than would be necessary for covering or inclosing separate tanks and a single driving shaft may be employed to operate all the sweeps, whereas if the tanks were spread out over an extended area, separate driving machinery and accessories would be required.

In each of the arrangements shown in Figs. 1, 3, 6, 11 and 12, each of the separating regions, excepting the upper one which is open to inspection, is provided with a sampling cock Q, so that if the overflow on top of the tank is cloudy, it is possible to determine in which of the separating regions the trouble arises. In the arrangements shown in Figs. 8 and 10, this is not necessary because the several flow-regions are individually open to inspection.

In all forms of the apparatus shown space is economized and the cost of installation and operation are largely reduced. The apparatus is in each instance organized to operate continuously, but may be operated intermittently if desired. In some respects the apparatus shown in Figs. 8 and 10 has advantages as the behavior of the material in such apparatus may be more closely watched, but the other arrangements shown have the advantage that the height of the apparatus is reduced and the total discharge is at the top of the tank thereby conserving the mill head, which is an important point in the practical handling of the large volumes of material. Some of the arrangements have the further advantage of the added flexibility due to the subjacent tank volume beneath the superposed trays, but a like advantage may be attained in the arrangement of Figs. 8 and 10, for example, by emptying the materials from the upper trays into the lower tray for final thickening and storage.

What I claim is:

1. A separating unit for the purpose described, comprising a plurality of superposed settling trays, a plurality of superposed sweeps positioned respectively immediately above the bottoms of the several trays and having a common support, mechanism for moving the support to impart a slow sweeping movement to the several sweeps, an inlet header and an overflow outlet at the upper part of each tray, individually controllable connections for supplying pulp to each of the headers, and a discharge outlet for the thickened pulp at the bottom of each tray.

2. A separating unit for the purpose described, comprising a plurality of superposed circular settling trays, a vertical shaft extending centrally through said trays, a plurality of sweeps carried by said shaft and positioned respectively immediately above the bottoms of said trays, mechanism for rotating said shaft to impart a slow sweeping movement to the several sweeps, an inlet and an overflow outlet at the upper part of each tray, a discharge outlet for the thickened material at the bottom of each tray, and means for preventing the downward flow of material from tray to tray along the shaft.

3. A separating unit for the purpose described, comprising a plurality of superposed circular settling trays, a hollow vertical shaft extending centrally through said trays, a plurality of sweeps carried by said shaft and positioned respectively immediately above the bottoms of said trays, mechanism for rotating said shaft to impart a slow sweeping movement to the several sweeps, an inlet and an overflow outlet at the upper part of each tray, connections for discharging the thickened material from the bottom of each of the several trays through the hollow shaft, and means for preventing the downward flow of material from tray to tray along the shaft.

4. A separating unit for the purpose described, comprising a tank containing a plurality of superposed sweeps having a common support, mechanism for moving the support to impart a slow sweeping movement to the several sweeps, the lowermost sweep being immediately above the bottom of the tank, a settling tray immediately beneath each sweep above the lowermost and inclosed by and overflowing into the tank, an inlet header at the upper part of each tray, and a discharge outlet for the thickened material at the bottom of each tray and at the bottom of the tank.

5. A separating unit for the purpose described, comprising a tank containing a plurality of superposed sweeps having a common support, mechanism for moving the support to impart a slow sweeping movement to the several sweeps, the lowermost sweep being immediately above the bottom of the tank, a settling tray immediately beneath each sweep above the lowermost and inclosed by and overflowing into the tank, an inlet header at the upper part of each tray, a discharge outlet for the thickened material at the bottom of each tray and at the bottom of the tank, and connections for leading the discharge from the several trays into the lower portion of the tank, whereby the said lower portion serves as a final thickening receptacle for the preliminarily thickened discharge from the several trays.

6. A separating unit for the purpose described, comprising a tank having an overflow discharge at its upper portion, a plurality of superposed settling trays with coned bottoms within the tank, and each having a centrally arranged inlet header and a peripheral overflow into the tank, means for feeding pulp to the several headers, means for drawing off the thickened pulp in the bottoms of the several trays, and means for preventing the downward flow of pulp from tray to tray, whereby there are established a plurality of independent superposed conical separating flow regions within the tank and from which the total overflow of clarified liquid is discharged at the top of the tank.

7. A separating unit for the purpose described, comprising a tank having an overflow discharge at its upper portion, a plurality of superposed settling trays with coned bottoms within the tank and each having a centrally arranged inlet header and a peripheral overflow into the tank, a vertical shaft extending centrally through said trays and carrying a plurality of superposed sweeps respectively positioned immediately above the bottoms of said trays, mechanism for rotating said shaft to impart a slow sweeping motion to said sweeps, means for feeding pulp to the several headers, centrally arranged means for drawing off the thickened pulp from the bottoms of the several trays, and means for preventing the downward flow of the pulp from tray to tray, whereby there are established a plurality of independent superposed conical separating flow regions within the tank and from which the total overflow of clarified liquid is discharged at the top of the tank.

8. A separating unit for the purpose described, comprising a tank having an overflow discharge at its upper portion, a plurality of superposed preliminary settling trays within said tank and each having at its upper portion an inlet header and a corresponding overflow discharge, and connections for establishing an underflow of thickened material from each tray, said connections discharging into the tank below the trays, means for preventing the downward flow of material from tray to tray, and connections for withdrawing thickened material from the bottom of the tank, whereby the portion of the tank below the trays constitutes an underlying final settling receptacle for the preliminarily thickened discharge from the several trays.

9. An apparatus for separating finely divided solids from liquids in which they are suspended, comprising a tank, a plurality of inclined partitions within the tank defining a plurality of inclined settling flow regions therein, an inlet header and overflow outlet at the upper portion of each flow region, means for drawing off the thickened material from the lower portion of each flow region, and means for preventing the admixture of the outgoing thickened material from each flow region with the adjacent incoming material to be separated.

10. An apparatus for separating finely divided solids from liquids in which they are suspended, comprising a tank, a plurality of partitions within the tank defining a plurality of settling flow regions therein, an inlet header and overflow outlet at the upper portion of each flow region, means for drawing off the thickened material from the lower portion of each flow region, and means for preventing the admixture of the outgoing thickened material from each flow region with the adjacent incoming material to be separated.

11. An apparatus for separating finely divided solids from liquids in which they are suspended, comprising a flow trough in which the flow is divided into a plurality of parallel currents, a plurality of superposed settling trays each having in its upper portion an inlet header and a corresponding overflow outlet for the clarified liquid and at its bottom means for establishing an underflow discharge of the thickened material, and a conduit connecting each of the several inlet headers to one of the parallel divisions of the flow trough.

12. An apparatus for separating finely divided solids from liquids in which they are suspended, comprising a flow trough in which the flow is divided into a plurality of parallel currents, a tank containing a plurality of superposed settling trays each having in its upper portion an inlet header and an overflow into the tank and at its bottom connections for establishing an underflow discharge of the thickened material, a conduit connecting each of the several inlet headers to one of the parallel divisions of the flow trough, and an overflow discharge for clarified liquid at the top of the tank.

13. A separating unit for the purpose described, comprising a tank, a plurality of superposed inlet headers, within the tank and means for feeding thereto the liquid to be treated, means corresponding to each header for separately collecting the thickened material and drawing off the clear liquid whereby a plurality of independent superposed separating regions are established within the tank, a sampling cock for each separating region and means for drawing off the thickened material from the collecting places.

In testimony whereof I affix my signature, in presence of two witnesses.

JOHN V. N. DORR.

Witnesses:
H. M. LEWIS,
M. A. BILL.